United States Patent
Trinchero et al.

(10) Patent No.: US 8,831,640 B2
(45) Date of Patent: Sep. 9, 2014

(54) METHOD AND SYSTEM FOR NOTIFYING PROXIMITY OF MOBILE COMMUNICATION TERMINALS USERS

(75) Inventors: Umberto Trinchero, Turin (IT); Guido Montalbano, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/499,639

(22) PCT Filed: Sep. 30, 2009

(86) PCT No.: PCT/EP2009/062687
§ 371 (c)(1),
(2), (4) Date: Jun. 12, 2012

(87) PCT Pub. No.: WO2011/038760
PCT Pub. Date: Apr. 7, 2011

(65) Prior Publication Data
US 2012/0252498 A1    Oct. 4, 2012

(51) Int. Cl.
*H04W 24/00* (2009.01)
*H04W 4/20* (2009.01)
*H04L 29/08* (2006.01)
*H04W 4/02* (2009.01)

(52) U.S. Cl.
CPC *H04W 4/02* (2013.01); *H04W 4/20* (2013.01); *H04L 67/18* (2013.01); *H04W 4/023* (2013.01)
USPC ............. 455/456.3; 455/456.1; 455/456.2

(58) Field of Classification Search
CPC ..... H04W 4/02; H04W 64/00; H04W 64/003; H04W 64/006; H04L 29/08657
USPC .................................... 455/456.3
See application file for complete search history.

(56) References Cited

U.S. PATENT DOCUMENTS

| | | | |
|---|---|---|---|
| 2005/0043037 A1* | 2/2005 | Ioppe et al. | 455/456.1 |
| 2006/0164238 A1 | 7/2006 | Karaoguz et al. | |
| 2007/0078965 A1* | 4/2007 | Shimamura et al. | 709/224 |
| 2007/0150444 A1 | 6/2007 | Chesnais et al. | |
| 2007/0243859 A1* | 10/2007 | Dinsing et al. | 455/414.1 |
| 2008/0154697 A1 | 6/2008 | Guday et al. | |
| 2009/0030999 A1 | 1/2009 | Gatzke et al. | |

FOREIGN PATENT DOCUMENTS

| | | |
|---|---|---|
| EP | 1691565 A1 | 8/2006 |
| WO | 03/009605 A2 | 1/2003 |
| WO | 2007/059241 A1 | 5/2007 |

OTHER PUBLICATIONS

International Search Report dtd Jan. 21, 2010, PCT/EP2009/062687.
Written Opinion, PCT/EP2009/062687.
Lhuiller, N., et al., "A simple distance-based update scheme to track mobile user proximities", Motorola, 2004, 4 pages.

(Continued)

*Primary Examiner* — Mazda Sabouri
(74) *Attorney, Agent, or Firm* — Banner & Witcoff, Ltd.

(57) ABSTRACT

A method for notifying proximity of users of mobile communication terminals, comprising: a) having a mobile communication terminal obtaining from a remote server data suitable to be used by the mobile communication terminal for deriving a distance between a position of another mobile communication terminal and the mobile communication terminal; b) having the mobile terminal determining, based on said obtained data, whether the position of the other mobile communication terminal falls within a predetermined distance range; and c) in case the position of the other mobile communication terminal falls within said predetermined distance range, having the mobile communication terminal generating a notification for the user of the mobile communication terminal. A corresponding system is also disclosed.

8 Claims, 4 Drawing Sheets

(56) References Cited

OTHER PUBLICATIONS

A. Amir et al., "Buddy tracking—efficient proximity detection among mobile friends", IEEE Infocom 2004, Mar. 7-11, 2004, vol. 1, p. 309.

A. Kupper and G. Treu, "Efficient proximity and separation detection among mobile targets for supporting location-based community services", SIGMOBILE Mob. Comput. Commun. Rev., 10(3):1-12, 2006.

K. A. Li et al., "People Tones: A System for the Detection and Notification of Buddy Proximity on Mobile Phones", University of California, San Diego, Jun. 10-13, 2008.

* cited by examiner

METHOD AND SYSTEM FOR NOTIFYING PROXIMITY OF MOBILE COMMUNICATION TERMINALS USERS

CROSS REFERENCE TO RELATED APPLICATIONS

This is a U.S. National Phase Application under 35 U.S.C. §371 of International Application No. PCT/EP2009/062687, filed Sep. 30, 2009, which was published Under PCT Article 21(2), the entire contents of which are incorporated herein by reference.

BACKGROUND OF THE INVENTION

1. Field of the Invention

The present invention relates to proximity detection and notification of nearby mobile terminals in cellular networks.

2. Overview of the Related Art

Proximity detection and notification is an LBS (Location Based Services) application which increases social context-awareness of mobile users.

Proximity detection and notification (also labeled as proximity alert) applications are already known in the art.

In general, a proximity alert is generated for a first mobile terminal user when a second mobile terminal user (for example belonging to a buddy list of the first user) approaches. By being made aware of the second user proximity, the first user may for example send to the buddy an SMS (Short Message Service) or call him/her and, e.g., agree a place to meet.

A. Amir et al., "Buddy tracking—efficient proximity detection among mobile friends", IEEE Infocom 2004, 7-11 Mar. 2004, Vol. 1, p. 309, distinguishes two computational frameworks for proximity detection and notification. The first model involves a central server which keeps track of user locations and is responsible for computing and sending the alert messages to all pairs of friends (proximity is always regarded as mutual). In the second model, peer-to-peer, every pair of friends is responsible for keeping each other informed about their location, detecting proximity and sending alert messages. The article describes different algorithms (Strips and quadtree) for minimizing the number of location update messages sent over the network in both frameworks.

A. Kupper and G. Treu, "Efficient proximity and separation detection among mobile targets for supporting location-based community services", SIGMOBILE Mob. Comput. Commun. Rev., 10(3):1-12, 2006, describes different strategies for proximity detection and separation, as part of a position management framework providing different methods for exchanging position fixes between a GPS (Global Positioning System)—capable mobile device and a central server. The goal is to minimize the amount of exchanged messages. The central model and algorithm described by A. Amir et al. are adopted as a reference for comparison.

WO 2007/059241 provides a system for discovering objects of interest (items, individuals, locations, business services) relevant to the user context. The system comprises, but is not limited to, proximity notifications of nearby individuals (friends, with whom the user has an existing relationship, as well as unknown people matching a certain description). The architecture is based on agents, deployed on both the server and the client side. The discovery (i.e. proximity detection) process utilizes a polling mechanism, following a peer-to-peer computational model when using a peer-to-peer radio technology such as Bluetooth, and a central server model when using a location detection system such as GPS.

US 2008/154697 provides technologies for allowing people to detect others with common interest (like-minded people). Mobile devices configured with information about their users (interests) may federate, typically joining and leaving an ad-hoc federation in a transient manner. The approach follows a peer-to-peer computational model, where proximity detection is conditioned by a previous interest match.

US 2008/294724 provides a solution for enhancing community-based physical location awareness, detecting community members and sending notifications when members fall below a proximity threshold. A central server model is described for all kind of networks, even a Bluetooth-enabled WPAN (Wireless Personal Area Network).

US2009/030999 describes a contact proximity notification application, which notifies a user when one of his/her contacts is nearby. The architecture follows the centralized model and comprises a proximity notification server, a location server and a contacts server. Endpoints may send location updates to the location server, or the latter may periodically query the endpoints. Proximity may be determined by the location server or by the proximity notification server.

K. A. Li et al., "People Tones: A System for the Detection and Notification of Buddy Proximity on Mobile Phones", University of California, San Diego, Jun. 10-13, 2008, describes a set of methods for detecting proximity, reducing sensor noise in GSM (Global System for Mobile communications) readings (inducing false proximity detection), minimizing power consumption, and generating proximity peripheral cues. The computational model involves mobile terminals pushing their GSM cell tower readings to a central server, which detects proximity and sends notifications.

SUMMARY OF THE INVENTION

The Applicant observes that two computational frameworks emerge from prior art analysis: the central server model and the peer-to-peer model (best suitable for short-range ad-hoc networks). In both models the location capability is seen as belonging to mobile terminals, which periodically determine their own location via GPS (Global Positioning System) or GSM/UMTS (Universal Mobile Telecommunications System) network cell identification, and send the location fix to a proximity detector (the central server or the other peers). To minimize the number of messages, only significant location updates are sent over the network. The central server model may pose scalability concerns, because the central server is responsible for proximity detection and notification between all pairs of users. On the other hand, in a GSM/UMTS environment the peer-to-peer model suffers from a waste of bandwidth, as position fixes must be mutually exchanged between all participants. In both models the mobile network and the service provider are viewed as transparent to proximity detection.

According to an aspect of the present invention, a method is provided for notifying proximity of users of mobile communication terminals.

The method comprises having a mobile communication terminal obtaining from a remote server data suitable to be used by the mobile terminal for deriving a distance between a position of another mobile communication terminal and the mobile communication terminal.

The mobile terminal determines, based on said obtained data, whether the position of said another mobile communication terminal falls within a predetermined distance range.

In case the position of said another mobile communication terminal falls within said predetermined distance range, the mobile communication terminal generates a notification for the user of the mobile communication terminal.

The mobile communication terminal may obtain from the remote server geographic coordinates of the position at least of said another mobile communication terminal.

The mobile communication terminal may obtain from the remote server an indication of the distance between the mobile communication terminal and said another mobile communication terminal.

The mobile communication terminal may compare the distance of said another mobile communication terminal from the mobile communication terminal to a predetermined threshold distance.

The above actions may be repeated after a time interval that depends on the threshold distance and on the calculated distance between the mobile communication terminal and said another mobile communication terminal. Said time interval may be proportional to the difference between the calculated distance and the threshold distance.

The remote server may condition the provision of said data to the mobile communication terminal to an assessment of whether the mobile communication terminal is authorized to gain said data.

According to another aspect of the present invention, a computer program product is provided, comprising computer program code means adapted to perform the method of any one of the preceding claims when the computer program is executed on a data processing apparatus, particularly a mobile communication terminal.

Another aspect of the present invention relates to a mobile communication terminal configured for performing the above method.

Still another aspect of the present invention relates to a system comprising a server, a mobile communication terminal in communication relationship with the server, wherein the mobile communication terminal is configured for performing the above method.

Thus, according to an aspect thereof, the present invention provides a client/server method for distributed, scalable implementation of proximity detection and notification. The client application on the mobile terminal may periodically initiate a proximity detection process, asking the distance between two mobile terminals (that of the end user and that of his/her buddy), by sending a distance request to the server application. Advantageously, to minimize the number of requests, the location update policy is managed at application level on the client side, by means of an adaptive polling algorithm.

A SOA (Service Oriented Architecture) framework is provided, where LBS are viewed as telco capabilities offered by the mobile network service provider, enabling more complex services to be built upon them (aggregate telco capabilities). Advantageously, in this framework, mobile terminals do not need to be able to locate themselves and could ask the network for the information they need (the distance from buddies, which is based on location information).

An advantage of the present invention is that it guarantees location privacy (i.e., the minimum amount of disclosed location information) and status privacy (online/offline) of buddies, to discourage any possible "voyeur" behaviors.

BRIEF DESCRIPTION OF THE DRAWINGS

These and other aspects, features, and advantages of the present invention will become more readily apparent from the attached drawings and the detailed description of the preferred embodiments, which follow.

DETAILED DESCRIPTION OF EXEMPLARY EMBODIMENTS OF THE INVENTION

Figure 1:
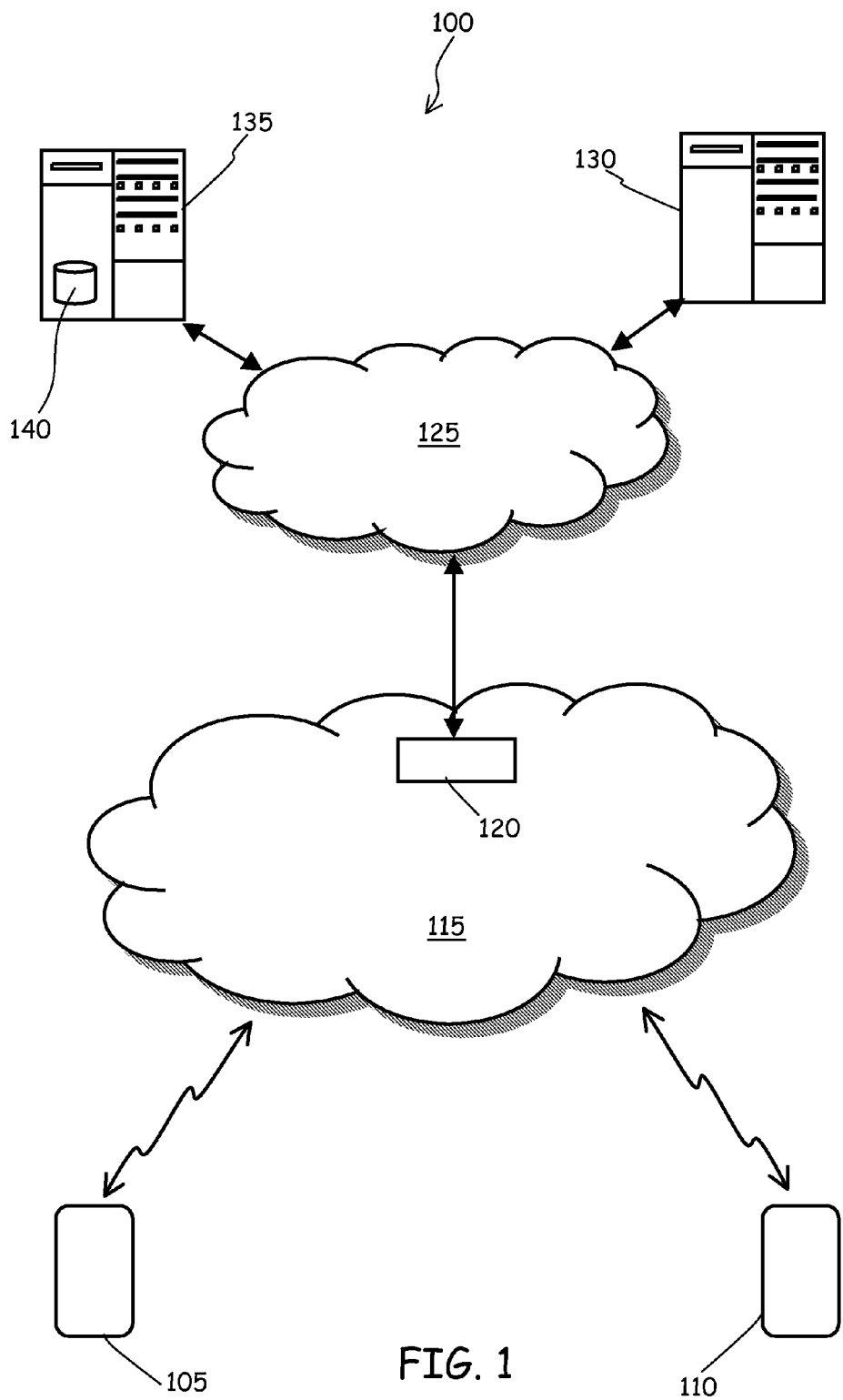
FIG. 1 depicts an illustrative scenario 100 of a preferred embodiment of the present invention.

FIG. 1 depicts an illustrative scenario 100 of a preferred embodiment of the present invention. A first mobile terminal 105 belongs to an end user and a second mobile terminal 110 belongs to one of his buddies. The two users are assumed to be subscribers of a GSM/UMTS cellular network 115. The network 115 may in practice consist of two or more different cellular networks, even of different service providers. The cellular network 115 is connected to an IP network 125 via a gateway 120. A location server 130 and a proximity server 135 are also connected to the IP network 125. The location server 130 is able to return the geographical coordinates of every mobile terminal, in response to a location request from the proximity server 135. By default, geographic coordinates are calculated using GSM/UMTS network cell identification, which is the least accurate measurement. The location server 130 may also use neighboring cell measurements to improve accuracy. The location server 130 may also support A-GPS (Assisted GPS) SUPL (Secure User Plane Location) protocol for even more accurate location of SUPL-compliant devices.

The end user, owner of the mobile terminal 105, wishes to be notified when the distance of his/her buddy, owner of the mobile terminal 110, is below a proximity threshold, as defined by the end user. A client application resides on mobile terminals 105 and 110. A server application resides on the proximity server 135, that acts as a proxy to the location server 130 and manages subscription to the proximity notification service, authentication, authorization, and privacy enforcement. The client application allows to define a proximity profile for the mobile terminal 110, which consists of the buddy's telephone number, a proximity threshold, a state of proximity ("far" or "near"), and a timer. The proximity profile definition triggers a message to the server application, which will contact the buddy client application to obtain authorization. In order to detect the proximity of the mobile terminal 110, the client application residing on the mobile terminal 105 performs periodic distance requests to the proximity server 135, according to the timer value.

Proximity detection is both part of the server-side and the client-side application logic. Upon a distance request from the client application residing on the mobile terminal 105, the proximity server 135 asks the location server 130 for the locations of the two mobile terminals 105 and 110. Given their geographical coordinates, the proximity server 135 calculates the distance between the two mobile terminals. To guarantee location privacy (i.e., the minimum amount of disclosed location information), the proximity server 135 may return to the client application only the distance between the two mobile terminals 105 and 110, and not the coordinates themselves. The client application eventually detects the proximity by comparing the distance to the proximity threshold.

Proximity notification is part of the client-side application logic, and is performed in a totally distributed way.

Proximity detection on the client side involves the adjustment of the period between two distance requests to the proximity server 135, i.e., the timer value. The period grows with the increase of the distance between the two mobile terminals 105 and 110, reducing the traffic over the cellular network 115 and the computational burden on both the proximity server 135 and the location server 130.

Figure 2:
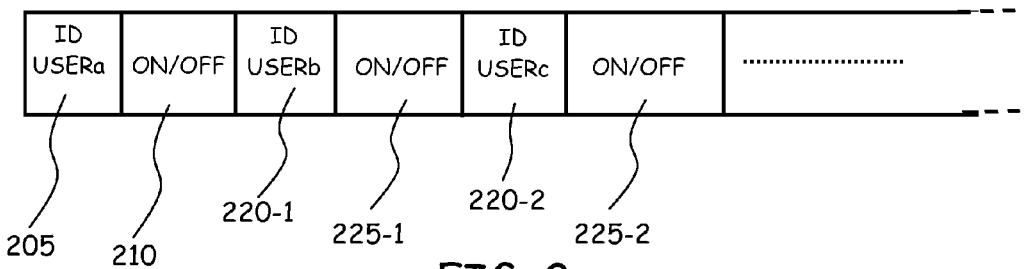
FIG. 2 schematizes a part of a database of a proximity server of the system of FIG. 1.

The proximity server 135 may keep a database 140 where data relating to the users subscribers of the proximity notification service are stored. In FIG. 2, a part of the database 140 is schematized, relating for example to the user USERa owner of the mobile terminal 105. For the generic mobile terminal user who has subscribed to the proximity notification service, like user USERa in the example, there is stored a univocal identifier (field 205), for example the IMSI (International Mobile Subscriber Identity), and, associated with the identifier, a status indicator (field 210), adapted to indicate whether or not the user USERa has activated the client application software on his/her mobile terminal 105. Also, there is stored a list of other mobile terminal users ("buddy list") who have given permission to be monitored to user USERa. The insertion of a certain user, like user USERb, in the buddy list of user USERa may for example be conditioned to an authorization granted by said other user USERb to user USERa; for example, the user USERa wishing to include another user like user USERb in his/her buddy list may, using a functionality of the client application software resident on his/her mobile terminal 105, send to the proximity server 135 a request to include user USERb in the buddy list; the proximity server 135 may then send to the mobile terminal 110 of user USERb an authorization request, and user USERb may then accept or deny the authorization. Preferably, a user like user USERb may, at any time, revoke the previously granted authorization, in which case the client application software resident on the mobile terminal 110 sends to the proximity server 135 a request to revoke authorization, and consequently the proximity server 135 removes user USERb from the buddy list of user USERa.

In particular, for each buddy user in the buddy list there is stored a univocal identifier (field 220-1 for user USERb, field 220-2 for user USERc, etc.), like the IMSI, and an indicator of the on/off status of the client software on the mobile terminal of the buddy user (field 225-1 for user USERb, field 225-2 for user USERc, etc.).

The proximity server 135 obtains the data defining the geographical position of the mobile terminal 105 of user USERa as well as those defining the geographical position of the mobile terminals of the buddy users from the location server 130, for example upon request from the mobile terminal of a subscriber user.

Figure 3:
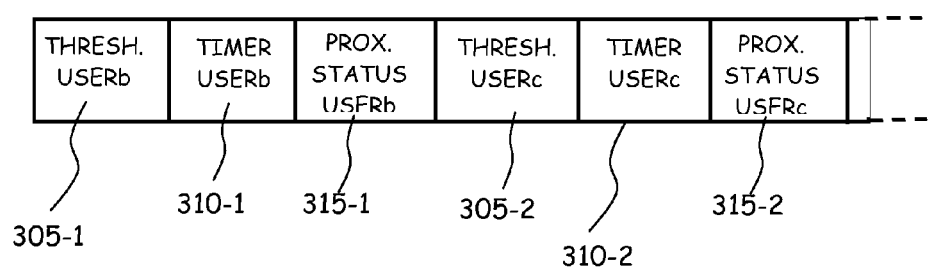
FIG. 3 schematizes data in a generic mobile communication terminal.

FIG. 3 schematically depicts the data stored at the generic mobile terminal of a user subscriber of the proximity notification service, like for example user USERa. The data comprises, for each buddy user like for example user USERb, data defining a threshold distance between the geographical position of the mobile terminal of user USERa and that of the buddy user (field 305-1 for user USERb, field 305-2 for user USERc, etc.), data defining a timer used by the client software application software resident on the mobile terminal 105 of user USERa for regularly checking whether the mobile terminal of that buddy user enters a proximity geographic area defined by the respective threshold distance (field 310-1 for user USERb, field 310-2 for user USERc, etc.), and data defining a proximity status of the buddy user (field 310-1 for user USERb, field 310-2 for user USERc, etc.).

Figure 4:
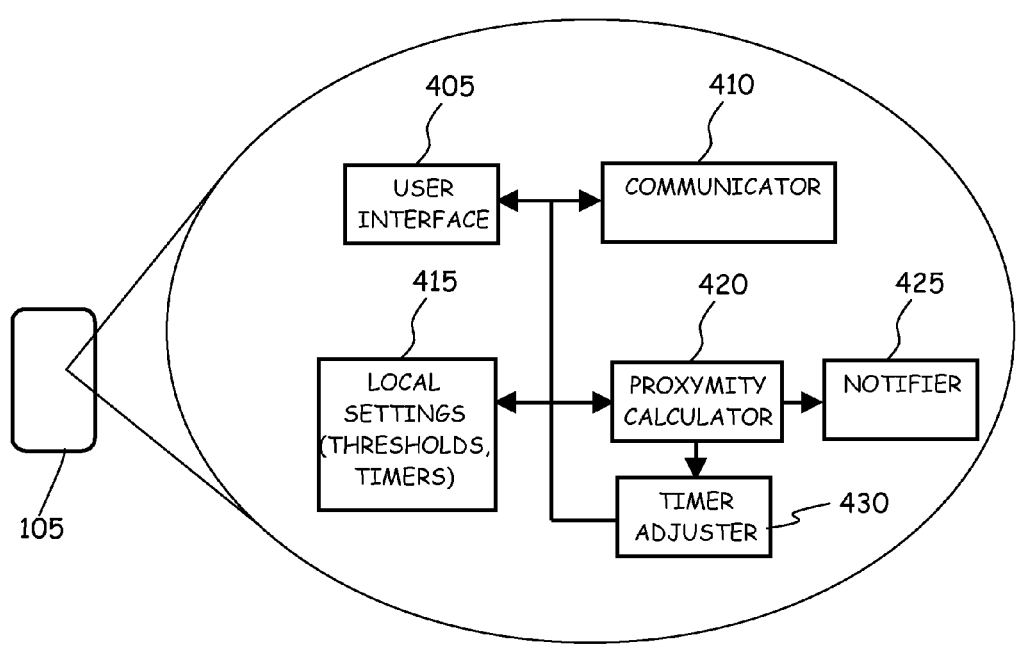
FIG. 4 is a block diagram of an application software resident on the mobile communication terminal.

FIG. 4 schematically shows, in terms of functional blocks, the main modules of the client application software resident on the mobile terminal of the generic user subscriber of the proximity notification service, like the mobile terminal 105 of user USERa.

A user interface module 405 allows interacting with the user USERa, for example for operations like setting the on/off status of the client application, adding buddy users to be monitored, removing buddy users from the monitored list, granting or revoking to another user the authorization to monitor user USERa, setting the threshold distance between the geographical position of the mobile terminal 105 of user USERa and the mobile terminal of a buddy user.

A communicator module 410 manages communications between the client application software on the mobile terminal 105 and the proximity server 135. In particular, the communicator module 410 may be configured to perform a regular polling for obtaining from the proximity server 135 updated values of the geographical position of the mobile terminal 105 and of the mobile terminals of the buddy users.

A module 415 manages local settings, local to the mobile terminal 105, as well as the data schematically depicted in FIG. 3. In particular, module 415 interacts with the user interface module 405 for receiving input settings (e.g., threshold distances) inputted by the user and storing them in the data structure shown in FIG. 3.

A proximity calculator module 420 uses the data, communicated by the proximity server 135, defining the distance between the mobile terminal 105 and the mobile terminal of the buddy, e.g. user USERb, for assessing (by comparison with the prescribed threshold distance) a condition of proximity between the mobile terminal 105 of user USERa and the mobile terminals of the buddy users.

A notifier module 425 interacts with the proximity calculator module 420 and manages the issuance of proximity notifications to the user USERa, through his/her mobile terminal 105, the proximity notifications being based on the proximity assessment made by the proximity calculator module 420.

A timer adjuster module 430 interacts with the proximity calculator module 420 and, based on the distance data received from the proximity server 135, adjusts the timers (field 320-1 for user USERb, field 320-2 for user USERc, etc.) used by the client software.

The proximity detection process is described in detail hereinafter.

Figure 5:
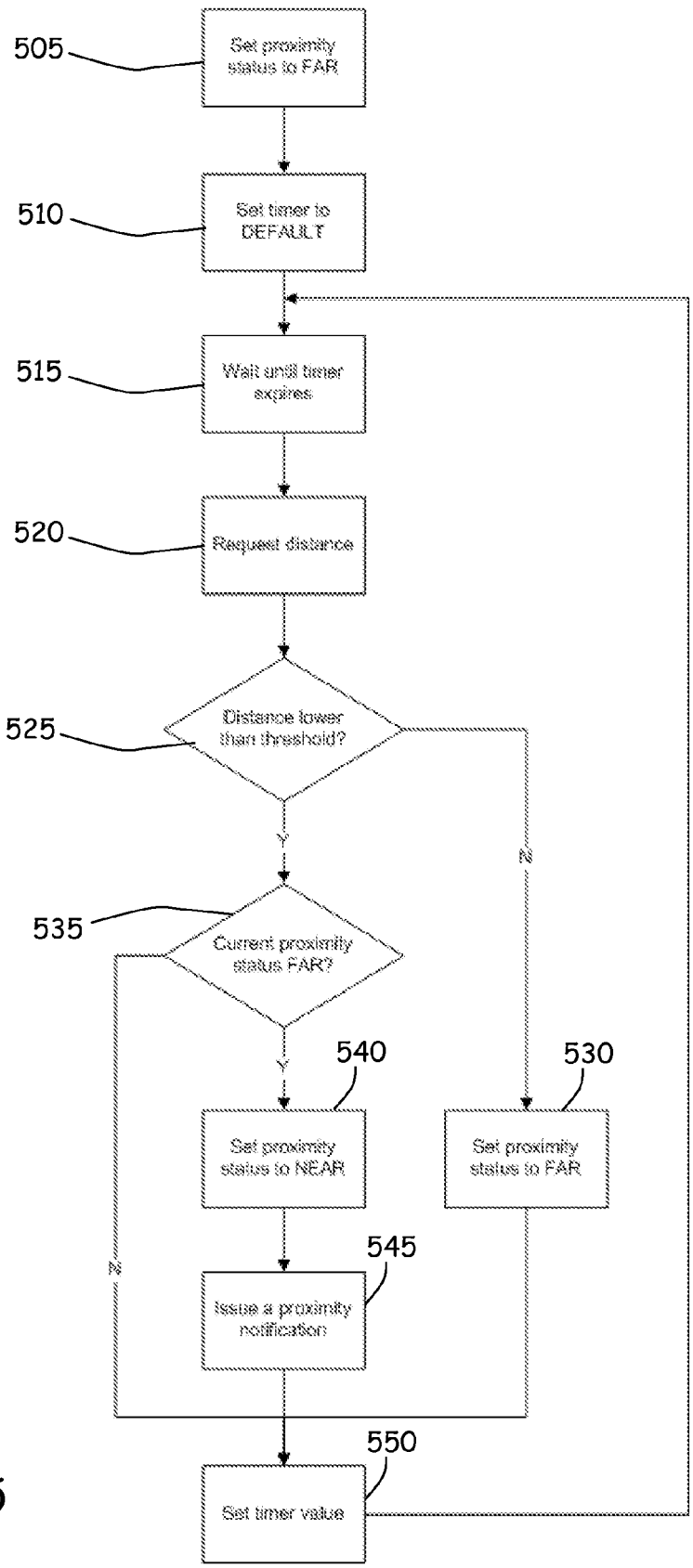
FIG. 5 is a flow diagram showing an example of the main actions performed by a client application in accordance with the proposed method.

FIG. 5 is a flow diagram showing an example of a client software application in accordance with the proposed method. The proximity detection process runs in background. When the client software application starts, a default value is provided for all states of proximity (block 505) and all timers (block 510), and the application enters its main cycle, waiting for a timer to expire (block 515). When a timer expires, the client software application sends a request to the proximity server 135 (block 520), asking for the distance between the client device (i.e., the mobile terminal 105 of the end user USERa) and the user associated with the expired timer (e.g., the mobile terminal 110 of the buddy USERb). The client software application compares the distance sent back by the proximity server 135 with the threshold distance (block 525): if the distance is not below the threshold distance (exit branch N of block 525) the state of proximity is set to "far" (block 530). Otherwise (exit branch Y of block 525) the current state of proximity is checked (block 535): if the current state of proximity is "far" (exit branch Y of block 535), the state of proximity is set to "near" (block 540) and a proximity notification to the end user USERa is issued through the mobile terminal (block 545); if the proximity state is already "near" (exit branch N of block 535) the proximity notification does not occur (because such a notification has already been issued at a previous time). The notification can take the form of a pop-up message on the display of the mobile terminal 105, an SMS message sent by the client application itself to the mobile terminal 105, a beep, a jingle, or any other notification mechanism. In any case, after the comparison of the distance data received from the proximity server 135 with the threshold distance locally stored at the mobile terminal 105, a new timer value is associated with the user USERb (block 550). The timer value increases and decreases according to the distance difference between the current distance and the threshold distance set for that buddy user. When this distance difference reduces to zero or becomes negative (indicating that the real distance is below the threshold distance), the client application should raise a proximity notification. In order to not miss the proximity event as soon as it occurs, the timer value should be chosen applying an estimation factor for the amount of time needed to cover the distance difference (the covering of the distance could result from movements of one or both mobile terminals). After setting the new timer value, the client software application goes back to the main cycle (block 515).

A proximity notification is issued to a user only if the state of proximity of a generic buddy changes from "far" to "near", i.e. if the distance of that buddy user from the user falls below the threshold distance set for that buddy user. If a buddy user is "near", but its state has not changed since the last cycle, the proximity notification has already been issued, and is preferably not re-issued. In addition to proximity notifications, separation notifications may be issued when the state of proximity of a generic buddy user changes from "near" to "far". That may be useful when a previous proximity notification is no longer valid; for example, in case the end user or the buddy is moving relatively fast, for example traveling on a car.

Figure 6:
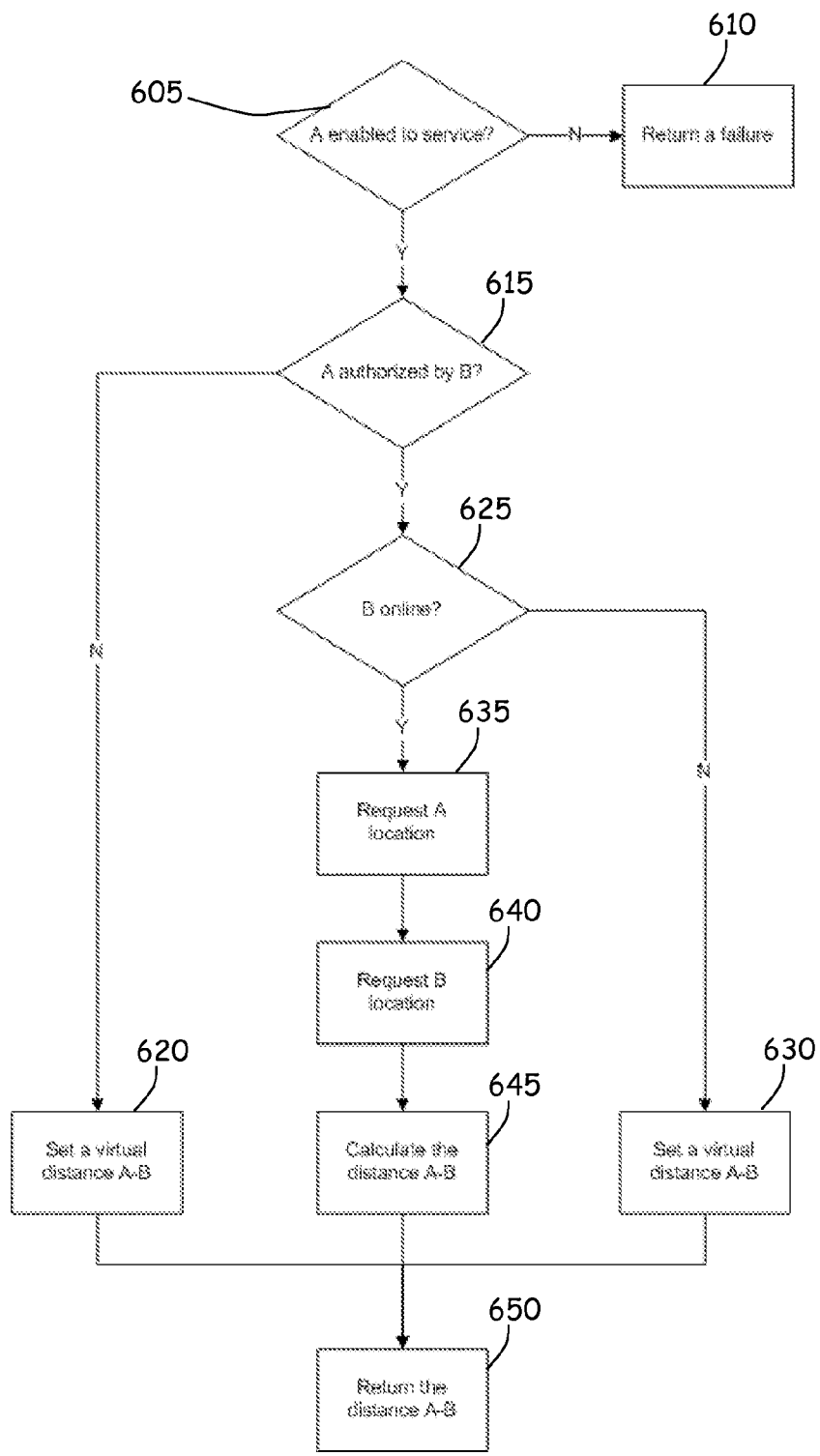
FIG. 6 is a flow diagram showing an example of the main actions performed by a server application in accordance with the proposed method.

FIG. 6 is a flow diagram showing an example of a server software application in accordance with the proposed method. When the proximity server 135 application receives a request coming from the mobile terminal 105 of the end user USERa, asking for the distance between the mobile terminal 105 and the mobile terminal of a buddy user, e.g. the mobile terminal 110 of the buddy USERb, the proximity server 135 application first checks whether the end user USERa is enabled to the proximity notification service, i.e. if the end user has subscribed to the service (block 605). If the end user USERa is not enabled (exit branch N of block 605), the proximity server 135 application returns to the mobile terminal 105 a failure message (block 610) and the procedure ends. If the end user is enabled (exit branch Y of block 605), the proximity server 135 application checks if the end user USERa has been granted authorization by his/her buddy to monitor the distance between them (block 615). If authorization has not been granted (exit branch N of block 615), the proximity server 135 application sets a virtual distance between the two mobile terminals (block 620), the virtual distance being sufficiently large for the buddy user USERb to be virtually seen as far from the user USERa. If authorization has been granted (exit branch Y of block 615), the proximity server 135 software application checks if the buddy USERb is online, i.e., if the client software application resident on the mobile terminal 110 of the buddy USERb is running (block 625). Every client software application running on the mobile terminals of the users sends an "I'm online" notification message to the proximity server 135 when the application is started, and an "I'm offline" notification message when the application is stopped. Every user could also set its status as offline even if the client application is running. If the buddy USERb is not online (exit branch N of block 625), the proximity server 135 application sets a virtual distance between the two mobile terminals (block 630). If the buddy USERb is online (exit branch Y of block 625), the proximity server 135 software application sends two requests to the location server 130, asking for the geographic coordinates of the mobile terminals 105 and 110 (blocks 635 and 640). When the geographic coordinates are received from the location server 130, the proximity server 135 software application calculates the distance between the two terminals (block 645) and returns the real/virtual distance to the mobile terminal 105 (block 650) of the end user. The procedure then ends.

The virtual distance returned to the mobile terminal 105 by the proximity server 135 software application is such that a proximity notification could not be issued by the client software application. Moreover, the value for the virtual distance is preferably chosen so as to affect the timer update and significantly delay the next request by the mobile terminal 105 to the proximity server 135. In this way, the end user USERa is not aware of any failure to obtain the distance, due to lack of authorization or availability issues concerning the buddy. This is regarded as good practice to preserve privacy of buddies and discourage "voyeur" behaviors by the end user.

The proximity detection process follows the same rules when the buddy mutually wishes to be notified of proximity state changes for the end user, according to a proximity threshold defined by the buddy. The mutuality is handled as an independent proximity detection process, where the two users simply exchange their roles (the buddy becomes the end user and the end user the buddy), not adding further complexity.

Several modifications to the described embodiment can be envisaged.

For example, the end user mobile terminal 105 may be able to determine his own position, using GPS or GSM/UMTS network cell identification. In this case the end user client software application, when asking the proximity server 135 for the distance between the two mobile terminals 105 and 110, may provide to the proximity server 135 the position already determined by itself. Thus, the location server 130 will be asked to locate only the mobile terminal 110.

The proximity server 135 may cache (for example, in the database 140) the geographic coordinates of the subscriber users for subsequent distance requests by the end users. This is useful, for example, when the same end user sends two (or more) distance requests to the proximity server 135 in a short interval of time, to check the proximity of two (or more) different buddies. If the end user mobile terminal 105 does not determine by itself its own position, a distance request to the proximity server 135 involves asking the location server 130 to locate both the end user and the buddy. Without a cache, the proximity server 135 is forced to ask the same end user location more than once, in a short interval of time. The cached geographic coordinates could also be useful if a large number of end users share buddies, even unknowingly (which is reasonable, because of the small world/six degrees of separation hypothesis). Geographic coordinates of the same buddy, requested by different end users, could be taken from the cache, thus avoiding need to again ask the location server 130. The cache should expire after a properly chosen period. The provision of a caching of the geographic coordinates of the subscriber users' mobile terminals may also be useful for implementing, at the proximity server 135, a regular polling process for regularly asking the location server 130 to provide updated geographic coordinates (the regular polling being performed independently from the receipt of requests from the subscriber users).

Another possibility is that the calculation of the distance between the end user and a buddy user is made at the end user mobile terminal, instead of being made at the proximity server. In this case, the proximity server 135 responds to a request from the end user mobile terminal by sending thereto the location (geographic coordinates) of the end user and of the buddy user, or even only the location of the buddy user, in case the mobile terminal of the end user has already available its location.

The proximity server may be co-located with the location server, and for example constitute a software application running on the location server.

The location server may in turn be a proxy towards several others platforms that provide location information services.

The client software application to be installed on the mobile terminals can be downloaded over-the-air directly by the mobile terminal, or installed thereon from a personal computer after downloading it from a server or from a CD/DVD.

The invention claimed is:

1. A method for notifying proximity of users of mobile communication terminals, comprising:
   a) obtaining by a mobile communication terminal a distance, derived by a remote server, between a position of another mobile communication terminal and a position of the mobile communication terminal;
   b) determining by the mobile communication terminal whether the distance falls within a predetermined distance range associated with the other mobile communication terminal, said predetermined distance range being different from a predetermined distance range associated with a third mobile communication terminal;
   c) in case the distance falls within the predetermined distance range, generating by the mobile communication terminal a notification for a user of the mobile communication terminal;
   d) updating, by the mobile communication terminal, data defining a time interval associated with the other mobile communication terminal, said updating depending on a predetermined threshold distance and on the obtained distance, said time interval proportional to a difference between the predetermined threshold distance and the obtained distance, and said data being different from data defining a time interval associated with the third mobile communication terminal; and
   repeating steps a), b) and c) after the time interval associated with the other mobile communication terminal.

2. The method of claim 1, wherein the distance obtained by the mobile communication terminal is based on geographic coordinates of the position of at least the other mobile communication terminal.

3. The method of claim 2, wherein the determining by the mobile communication terminal comprises comparing the obtained distance to a predetermined threshold distance.

4. The method of claim 1, wherein the obtaining by the mobile communication terminal comprises causing the remote server to condition provision of the distance to an assessment of whether the mobile communication terminal is authorized to gain the distance.

5. A computer readable storage device having computer-executable instructions stored thereon that, when executed by a data processing apparatus perform a method comprising:
   a) obtaining by a mobile communication terminal a distance, derived by a remote server, between a position of another mobile communication terminal and a position of the mobile communication terminal;
   b) determining by the mobile communication terminal whether the distance falls within a predetermined distance range associated with the other mobile communication terminal, said predetermined distance range being different from a predetermined distance range associated with a third mobile communication terminal;
   c) in case the distance falls within the predetermined distance range, generating by the mobile communication terminal a notification for a user of the mobile communication terminal;
   d) updating, by the mobile communication terminal, data defining a time interval associated with the other mobile communication terminal, said updating depending on a predetermined threshold distance and on the obtained distance, said time interval proportional to a difference between the predetermined threshold distance and the obtained distance, and said data being different from data defining a time interval associated with the third mobile communication terminal; and
   repeating steps a), b) and c) after the time interval associated with the other mobile communication terminal.

6. A mobile communication terminal comprising:
   a data processing apparatus; and
   a computer readable storage device having computer-executable instructions stored thereon that, when executed by a data processing apparatus, perform a method comprising:
   a) obtaining by a mobile communication terminal a distance, derived by a remote server, between a position of another mobile communication terminal and a position of the mobile communication terminal;
   b) determining by the mobile communication terminal whether the distance falls within a predetermined distance range associated with the other mobile communication terminal, said predetermined distance range being difference from a predetermined distance range associated with a third mobile communication terminal;
   c) in case the distance falls within the predetermined distance range, generating by the mobile communication terminal a notification for a user of the mobile communication terminal;
   d) updating, by the mobile communication terminal, data defining a time interval associated with the other mobile communication terminal, said updating depending on a predetermined threshold distance and on the obtained distance, said time interval proportional to a difference between the predetermined threshold distance and the obtained distance, and said data being different from data defining a time interval associated with the third mobile communication terminal; and
   repeating steps a), b) and c) after the time interval associated with the other mobile communication terminal.

7. A communication system comprising:
   a server;
   a mobile communication terminal in a communication relationship with the server, the mobile communication terminal including
   a data processing apparatus; and a computer readable storage device having computer-executable instructions stored thereon that, when executed by a data processing apparatus, perform a method comprising:
  a) obtaining by a mobile communication terminal a distance, derived by a remote server, between a position of another mobile communication terminal and a position of the mobile communication terminal;
  b) determining by the mobile communication terminal whether the distance falls within a predetermined distance range associated with the other mobile communication terminal, said predetermined distance range being different from a predetermined distance range associated with a third mobile communication terminal;
  c) in case the distance falls within the predetermined distance range, generating by the mobile communication terminal a notification for a user of the mobile communication terminal; and
  d) updating, by the mobile communication terminal, data defining a time interval associated with the other mobile communication terminal, said updating depending on a predetermined threshold distance and on the obtained distance, said time interval proportional to a difference between the predetermined threshold distance and the obtained distance, and said data being different from data defining a time interval associated with the third mobile communication terminal; and
  repeating steps a), b) and c) after the time interval associated with the other mobile communication terminal.

8. The method of claim 1, comprising:
  e) obtaining by the mobile communication terminal another distance, derived by a remote server, between a position of the third mobile communication terminal and the position of the mobile communication terminal;
  f) determining by the mobile communication terminal whether the other distance falls within the predetermined distance range associated with the third mobile communication terminal; and
  g) in case the distance falls within the predetermined distance range associated with the third mobile communication terminal, generating by the mobile communication terminal a notification for a user of the mobile communication terminal; and
  h) updating, by the mobile communication terminal, data defining the time interval associated with the third mobile communication terminal.

* * * * *